United States Patent
Hayasaka et al.

(10) Patent No.: US 10,977,124 B2
(45) Date of Patent: Apr. 13, 2021

(54) DISTRIBUTED STORAGE SYSTEM, DATA STORAGE METHOD, AND SOFTWARE PROGRAM

(71) Applicant: HITACHI, LTD., Tokyo (JP)

(72) Inventors: Mitsuo Hayasaka, Tokyo (JP); Keiichi Matsuzawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 201 days.

(21) Appl. No.: 15/762,862

(22) PCT Filed: Jan. 7, 2016

(86) PCT No.: PCT/JP2016/050292
§ 371 (c)(1),
(2) Date: Mar. 23, 2018

(87) PCT Pub. No.: WO2017/119091
PCT Pub. Date: Jul. 13, 2017

(65) Prior Publication Data
US 2018/0267856 A1 Sep. 20, 2018

(51) Int. Cl.
*G06F 11/00* (2006.01)
*G06F 11/10* (2006.01)
*G06F 3/06* (2006.01)

(52) U.S. Cl.
CPC .......... *G06F 11/1076* (2013.01); *G06F 3/061* (2013.01); *G06F 3/064* (2013.01);
(Continued)

(58) Field of Classification Search
CPC ........ G06F 3/06; G06F 11/1076; G06F 3/061; G06F 3/0619; G06F 3/0631; G06F 3/064;
(Continued)

(56) References Cited

U.S. PATENT DOCUMENTS 7,546,342 B2 6/2009 Li et al.
9,990,252 B1 * 6/2018 Morlang ............. H03M 13/373
(Continued)

FOREIGN PATENT DOCUMENTS

JP 2005-072772 A 3/2005
JP 2007-073003 A 3/2007

OTHER PUBLICATIONS

International Search Report dated Apr. 12, 2016 of the PCT International Application No. PCT/JP2016/050292.

*Primary Examiner* — Albert Decady
*Assistant Examiner* — Osman M Alshack
(74) *Attorney, Agent, or Firm* — Volpe Koenig (57) ABSTRACT

A distributed storage system includes a plurality of storage nodes including: a storage device for storing data in such a way that the data can be written thereto and read therefrom; a memory in which a software program is recorded; and a CPU for executing the software program. The memory stores group management information in which a group configured with a plurality of storage nodes and the storage nodes that configure the group are associated with each other and recorded. The CPU converts data into a plurality of data blocks so that the data is redundant at a predetermined data protection level, and stores the data blocks into each of a plurality of storage nodes belonging to the same group based on the group management information.

11 Claims, 9 Drawing Sheets

(52) U.S. Cl.
CPC ............ *G06F 3/067* (2013.01); *G06F 3/0619* (2013.01); *G06F 3/0631* (2013.01)

(58) Field of Classification Search
CPC .... G06F 3/067; G06F 3/0689; G06F 11/3006; G06F 11/3034
USPC ........................................ 714/763, 766, 770
See application file for complete search history.

(56) References Cited

U.S. PATENT DOCUMENTS

| | | | | |
|---|---|---|---|---|
| 2007/0101070 A1* | 5/2007 | Matsunami | ........... | G06F 3/0658 711/147 |
| 2008/0068899 A1* | 3/2008 | Ogihara | ................ | G06F 3/0665 365/189.04 |
| 2008/0151724 A1* | 6/2008 | Anderson | ............ | G11B 33/127 369/53.42 |
| 2009/0049240 A1* | 2/2009 | Oe | ...................... | G06F 11/2061 711/114 |
| 2009/0319749 A1* | 12/2009 | Ogihara | ................ | G06F 3/0635 711/170 |
| 2009/0319834 A1* | 12/2009 | Ogihara | .................. | G06F 3/067 714/42 |
| 2009/0327642 A1* | 12/2009 | Ogihara | ................ | G06F 11/008 711/170 |
| 2010/0306495 A1* | 12/2010 | Kumano | ................ | G06F 3/0665 711/170 |
| 2011/0138144 A1* | 6/2011 | Tamura | ................. | G06F 3/0608 711/166 |
| 2012/0197868 A1* | 8/2012 | Fauser | ................ | G06F 16/2471 707/714 |
| 2014/0310557 A1* | 10/2014 | Chambliss | ............ | G06F 3/0619 714/6.22 |
| 2016/0308965 A1* | 10/2016 | Yamakawa | ......... | H04L 67/1097 |

* cited by examiner

T50 BASE GROUP MANAGEMENT TABLE

| BASE GROUP ID (C2) | CONFIGURATION NODE (C4) |
|---|---|
| ... | ... |
|  |  |
|  |  |
|  |  |
|  |  |

T60 EXTENDED GROUP MANAGEMENT TABLE

| UPPER GROUP ID (C12) | LOWER GROUP ID (C14) |
|---|---|
| ... | ... |
|  |  |
|  |  |
|  |  |
|  |  |

FIG. 5

T20 METADATA MANAGEMENT TABLE

| OBJECT ID (C22) | GROUP ID (C24) | UPPER GROUP ID (C26) | DUPLICATION DESTINATION NODE (C28) |
|---|---|---|---|
| ... | ... | ... |  |
|  |  |  |  |
|  |  |  |  |
|  |  |  |  |

DISTRIBUTED STORAGE SYSTEM, DATA STORAGE METHOD, AND SOFTWARE PROGRAM

TECHNICAL FIELD

The present invention relates to a distributed storage system.

BACKGROUND ART

The amount of data to be handled by IT (Information Technology) systems is rapidly increasing and there is demand for storage that can accommodate a large amount of data. Under such circumstances, as a recent storage system, there is a distributed storage system in which a plurality of storages or servers are connected to each other through a network to configure one storage pool as a whole, and a plurality of storages or servers belonging to a storage pool process and store data in a distributed manner. Such a distributed storage can provide scalable capacity and performance.

Generally in the distributed storage system of this type, a local storage device directly connected to each storage node is the final storage location of data. The distributed storage system is designed to protect data by diving write data from the host into a plurality of data blocks, generating redundant data blocks for the divided data blocks according to the erasure coding scheme, and storing the divided data blocks and the redundant data blocks to each of a plurality of storage nodes (see Patent Literature 1).

CITATION LIST

Patent Literature

Patent Literature 1: U.S. Pat. No. 7,546,342

SUMMARY OF INVENTION

Technical Problem

In the existing distributed storage system disclosed in Patent Literature 1, the divided data blocks and the redundant data blocks are respectively arranged in different storage nodes in a distributed manner. Thus, if a failure occurs in any of the storage nodes, it is possible to obtain data blocks from the remaining storage nodes to recover (rebuild) the original data by a given operation on the obtained data blocks.

Here, the upper limit of the number of lost data blocks from which data can be recovered is referred to as the data protection level. Data can be recovered even if storage nodes whose number does not exceed the data protection level fail simultaneously (overlapping failure). The number of divided data blocks and the number of redundant data blocks are respectively determined in accordance with the required data protection level. For example, when the number of divided data blocks is 2 and the number of redundant data blocks is 1, the data block format is expressed as 2D1P. Further, when the number of divided data blocks is 3 and the number of redundant data blocks is 1, the data block format is expressed as 3D1P. Similarly, when the number of divided data blocks is n and the number of redundant data blocks is m, the data block format is expressed as nDmP.

In the distributed storage system of this type, a plurality of storage nodes in which divided data blocks and redundant data blocks are arranged are randomly selected from the entire storage pool. For this reason, after the data blocks are distributed to each of the storage nodes, if storage nodes whose number exceeds the data protection level fail simultaneously, any data should be lost and a non-recoverable state occurs.

An object of the present invention is to provide a technique for reducing the probability of occurrence of data loss when a failure that exceeds the data protection level occurs in a distributed storage system.

An object of the present invention is to provide a technique for reducing the probability of occurrence of failure redundantly in a plurality of data blocks when a plurality of nodes fails in a distributed storage system.

Solution to Problem

A distributed storage system according to an embodiment of the present invention includes a plurality of storage nodes, each of which includes: a storage device for storing data in such a way that the data can be written thereto and read therefrom; a memory in which a software program is recorded; and a CPU for executing the software program. The memory stores group management information in which a group configured with a plurality of storage nodes and the storage nodes that configure the group are associated with each other and recorded. The CPU converts the data into a plurality of data blocks so that the data is redundant at a predetermined data protection level, and stores the data blocks to each of a plurality of storage nodes belonging to the same group based on the group management information.

Advantageous Effects of Invention

According to the present invention, a plurality of data blocks of the same data are arranged in storage nodes of the same group, so that when a plurality of storage nodes fail simultaneously, it is possible to limit the occurrence of overlapping failure of a plurality of data blocks pertaining to the same data, to within the group. As a result, it is possible to reduce the probability of occurrence of overlapping failure in a plurality of data blocks.

DESCRIPTION OF EMBODIMENTS

Hereinafter, preferred embodiments of the present invention will be described with reference to the accompanying drawings.

Some embodiments will be described with reference to the accompanying drawings. Note that the embodiments described below do not limit the invention according to the claims. Further, all the elements and their combinations described in the embodiments are not necessarily required for the solution of the invention.

In the following description, various types of information may be described with the expression of "XX table", but the various types of information can also be represented by data structure other than table. In order to show that the information does not depend on the data structure, "XX table" can be referred to as "XX" information".

In the following description, the process may be described with program as subject. However, the subject of process may also be hardware or processor because the program is executed by the hardware itself or by the processor the hardware has (for example, MP (Micro Processor)) to perform a given process by appropriately using the storage resource (for example, memory) and/or a communication interface device (for example, port). The program source may be, for example, a program distribution server or a storage medium.

The following discloses a method for improving the performance with highly-reliable data arrangement in a distributed storage system. The storage system includes one or more storage devices for storing data. In the following description, a storage area given by one or more storage units is referred to as a media area. The storage device is, for example, a hard disk drive (HDD), a solid state drive (SSD), an RAID including a plurality of drives, or the like.

The storage system manages data for each object which is a logical group of data. Further, access to data occurs for each object. As the object, there are, in addition to normal file, archive file, backup file, object for storing directory information, object for managing empty blocks, virtual volume, and volume file of a virtual computer. The object can be part of a file or part of a volume.

First Embodiment

Figure 1:
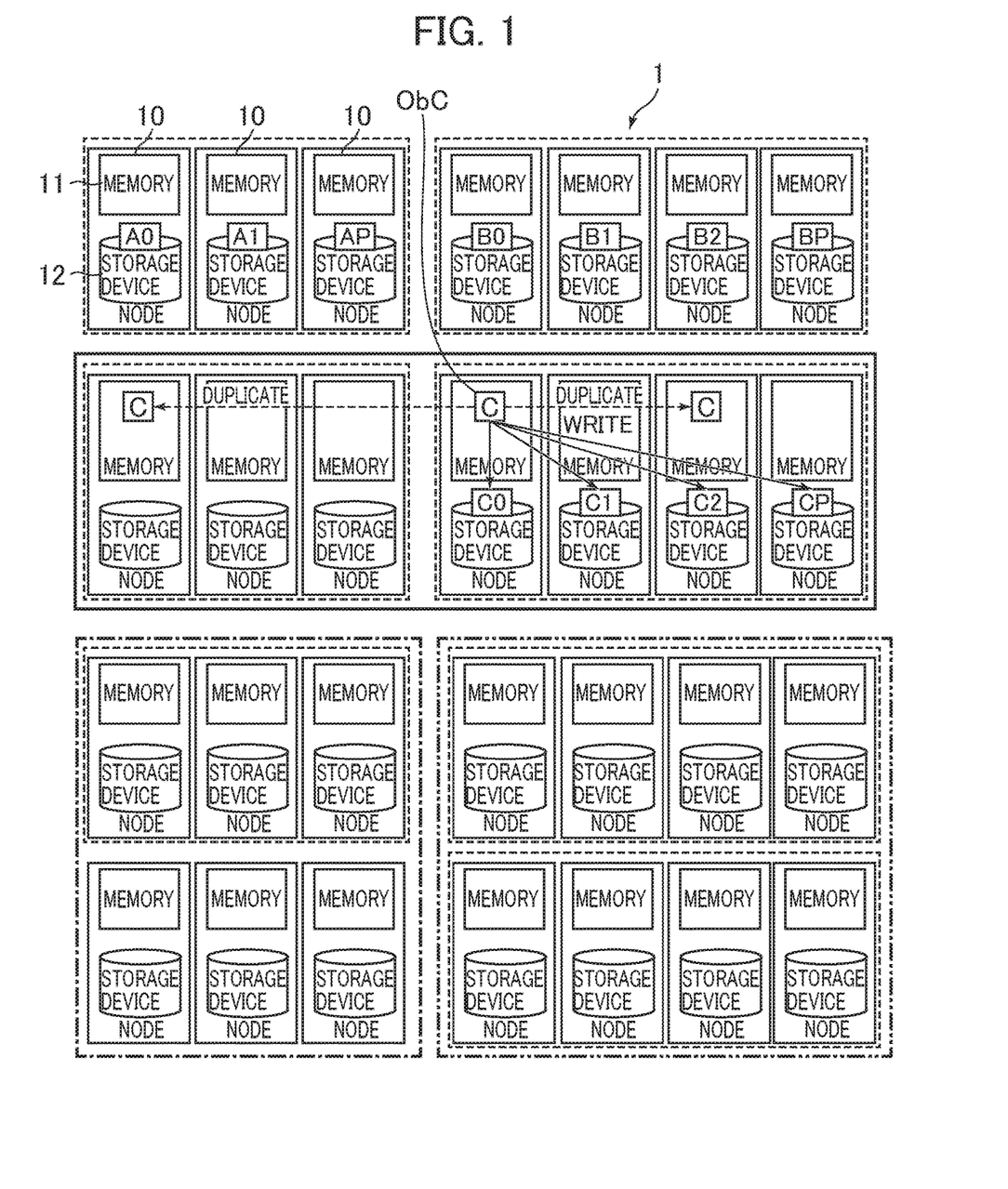
FIG. 1 is a block diagram showing a schematic configuration of a distributed storage system according to a first embodiment.

FIG. 1 is a block diagram showing a schematic configuration of a distributed storage system according to a first embodiment. A distributed storage system 1 has a plurality of storage nodes 10. Each storage node 10 includes a memory 11 and a storage device 12.

Further, in the distributed storage system 1, several groups are configured with the storage nodes 10. For example, base groups are respectively configured with the storage nodes 10 surrounded by the short-dashed line and with the storage nodes 10 surrounded by the long-dashed line.

Further, the base groups are further grouped to form an extended group which is superior. For example, extended groups are respectively configured with the storage nodes 10 surrounded by the solid line, the storage nodes 10 surrounded by the one-dot chain line, and the storage nodes 10 surrounded by the two-dot chain line.

For example, it is possible to handle data with the data block configuration of 6D1P by further grouping the group configured with three storage nodes corresponding to 2D1P and the group configured with four storage nodes corresponding to 3D1P. Note that the case in which the number of redundant data is one is shown as an example. However, the number of redundant data may also be m, namely, nDmP.

The distributed storage system 1 applies data block division process and redundant data block generation process to the received data (object). The data division process is a process for dividing data into a predetermined number of divided data blocks. The redundant data block generation process is a process for generating a redundant data block for data protection, with respect to a plurality of divided data blocks obtained by the block generation process. The example of FIG. 1 shows divided data blocks A0, A1 generated from data ObA and a redundant data block AP, as well as divided data blocks B0, B1, B2 generated from data ObB and a redundant data block BP. The divided data blocks A0, A1 and the redundant data block AP, as well as the divided data blocks B0, B1, B2 and the redundant data block BP are respectively arranged in different base groups.

When newly receiving data (object) ObC, the distributed storage system 1 stores the data in a memory 11 of the storage node 10 of the group which is the write destination of the data ObC. Further, the distributed storage system 1 stores a copy of the data in the memory 11 of the storage node 10 within an extended group 1 (solid line) corresponding to the upper group including the group which is the write destination of the data ObC. The creation of the copy enables an organization of subsequent data update requests.

In addition, the distributed storage system 1 generates the divided data blocks C0, C1, C2 and the redundant data block CP by applying the data division process and the redundant data block generation process on the data ObC, based on LRU (Least Recently Used) and on the elapsed time after the duplication. Then, the distributed storage system 1 distributes and arranges the generated divided data locks C0, C1, C2 and the generated redundant data block CP into each of the storage nodes 10 of the write destination group in the storage device 12.

Figure 2:
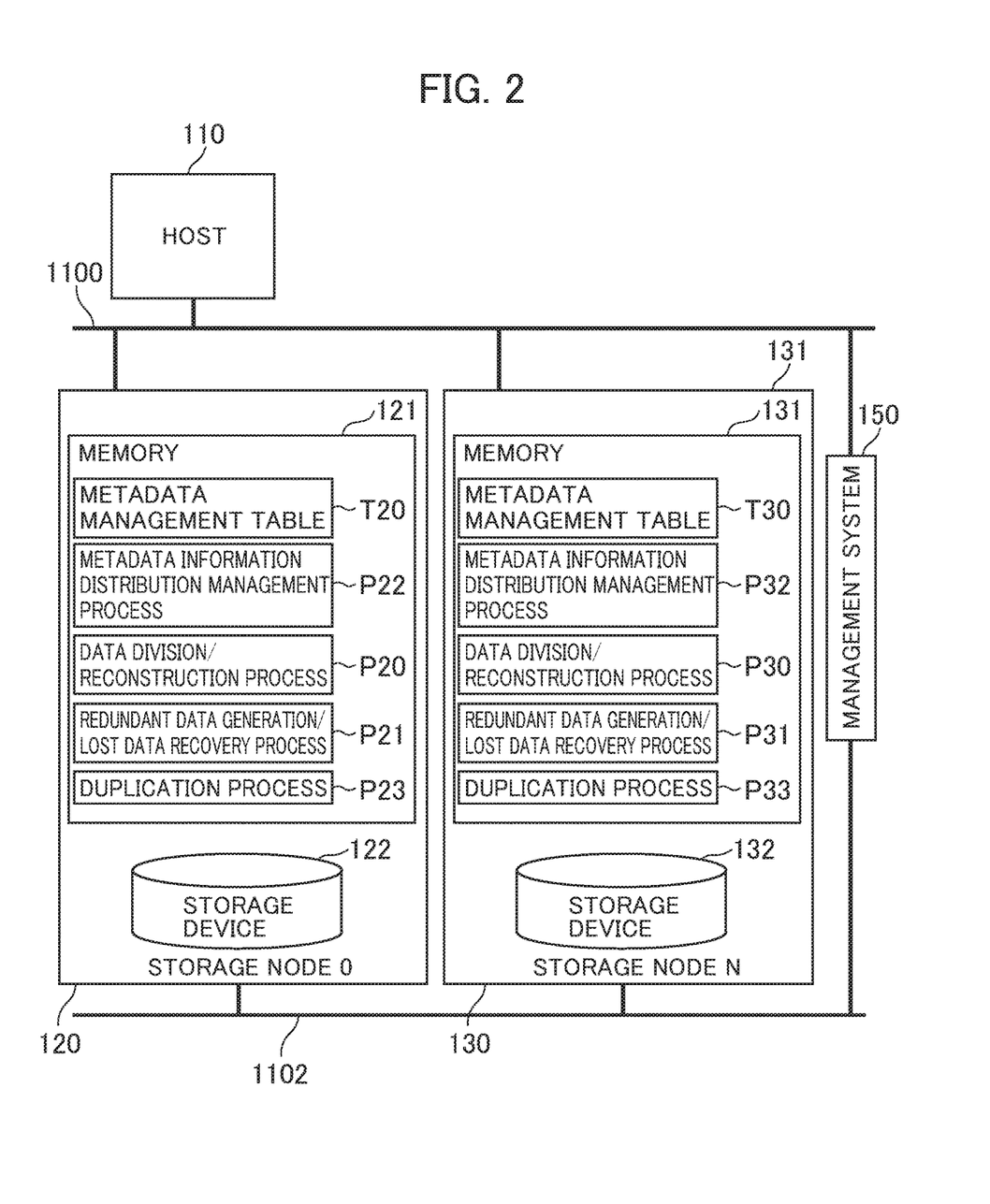
FIG. 2 is a diagram showing the software process of storage nodes.

FIG. 2 is a diagram showing the software process of the storage nodes.

The host 110 is, for example, a storage located in a local office of a company, a PC, a server, or a smartphone. The host 110 transfers data to the storage nodes 120 and 130 through a data network 1100. The storage node 120 and the storage node 130 are the same as the storage node 10 shown in FIG. 1, and basically both have the same configuration.

The distributed storage system 1 has the storage nodes 120 and 130. A memory 121 of the storage node 120 stores a data division/reconstruction process program P20, a redundant data generation/lost data recovery process program P21, a metadata information distribution management process program P22, and a duplication process program P23.

The memory 121 further stores a metadata management table T20. The metadata management table T20 is a management table for managing information on data (object), a plurality of data blocks into which the data is divided, and redundant data blocks for the data blocks.

In the metadata management table T20, the object ID of data, the group ID of the group to which the storage node 10 which is the data storage destination belongs, the upper group ID which is identification information of the group (extended group) superior to the group to which the storage node 10 belongs, and the duplication destination node which is the node for storing a copy of the data are associated with each other and stored. For example, it is assumed that the metadata information distribution management process program P22 obtains information of the node configuration of a storage node in which data of an object is placed. In this case, the metadata information distribution management process program P22 refers to the metadata management table T20, obtains the group ID from the object ID of the data, and obtains the information of the node configuration from the obtained group ID.

Note that the present embodiment shows an example of using the metadata management tables T20 and T30. However, as another example, an embodiment where the metadata management tables T20 and T30 are not provided is also possible. For example, the metadata management table T20 and T30 may be eliminated if the metadata information distribution management process program P22 is configured to calculate the node configuration information with respect to the object ID by a predetermined calculation formula.

The host 110 in FIG. 2 transfers the data of the object to the storage nodes 120 and 130 through a network 1100. For example, the storage node 120 receives the transferred data of the object. The metadata information distribution management process program P22 determines the group ID of the group to which the storage node for storing the received object belongs, the upper group ID of the group which is superior to it, and the storage node (duplication destination node) for storing a copy of the data of the object, from the object ID of the received object (reception object). It may also be possible that the duplication destination node determines them from the object ID of the reception object by referring to the metadata management table T20. For example, when the data is tripled by duplication, the duplication destination node can be obtained by a calculation using the number of storage nodes (the number of nodes) that configure the group indicted by the upper group ID, as well as using the object ID of the data.

After that, the duplication process program P23 creates a copy of the reception object to the memory of the duplication destination node. After the copy is created, a write request to the reception object is repeatedly performed on the copy. When a predetermined condition is satisfied based on LRU or the elapsed time after the duplication, the write process for writing the data on the memory to the storage device is performed. In the write process, the data division/reconstruction process program P20 performs the data division process, and the redundant data generation/lost data recovery process program P21 performs the redundant data block generation process.

After that, the data division/reconstruction process program P20 distributes and arranges a plurality of data blocks into a plurality of storage nodes that are determined as storage nodes in which the data blocks are distributed and arranged, through an internal network 1102. When the distribution and arrangement of the data blocks is completed, the duplication process program P23 deletes the copy remaining on the memory. Then, the duplication process program P23 returns a completion response to the host 110 through the data network 1100.

By a series of processes described above, it is possible to prevent parity calculation from frequently occurring due to a small-sized write request, and to improve performance as a storage system. At the same time, it is possible to reduce the probability of occurrence of data loss when overlapping failure occurs in a plurality of storage nodes by avoiding randomly arranging the data in all storage nodes.

Figure 3:
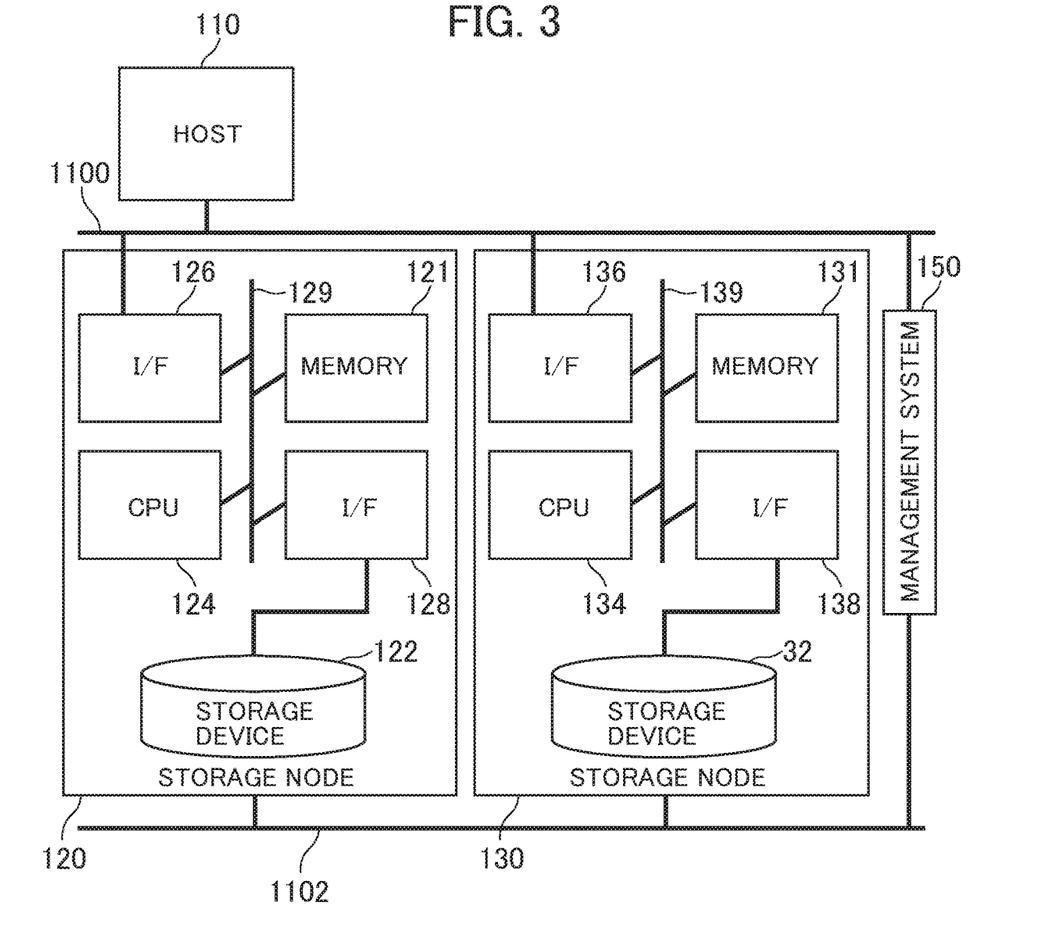
FIG. 3 is a diagram showing a hardware configuration example of a host 110 and storage nodes 120 and 130.

FIG. 3 is a diagram showing a hardware configuration example of the host 110 and the storage nodes 120 and 130. The storage nodes 120 and 130 are connected to each other to the management system 150 through the internal network 1102. It may also be possible to generate another independent network in order to manage the distributed storage nodes 120 and 130. The storage nodes 120 and 130 are connected to one or a plurality of hosts 110 through the data network 1100. The host 110 is, for example, server computer, file storage of a branch office, PC, or smartphone.

The management system 150 is configured with one or a plurality of computers. For example, the management system 150 includes a server computer, and a terminal that accesses the server computer through a network. The administrator manages and controls the storage nodes 120 and 130 through a display device and input device of the terminal.

Each of the internal network 1102 and the data network 1100 is, for example, WAN (Wide Area Network), LAN (Local Area Network), Internet, SAN (Storage Area Network), public line, or dedicated line. The internal network 1102 and the data network 1100 may be the same network.

The storage nodes 120 and 130 will be described. Here, a description is given of the storage node 120. However, the description is equally applicable to the storage node 130.

The storage node 120 includes a memory 121, a storage device 122, a CPU 124, an interface unit 126, an interface unit 128, and a bus 129. The memory 121, the storage device 122, the CPU 124, the interface unit 126 and the interface unit 128 are connected to each other through the bus 129. The interface unit 126 is further connected to the data network 1100 to allow communication by the CPU 124 through the data network 1100. The interface unit 128 is further connected to the storage device 122 to allow communication between the CPU 124 and the storage device 12.

The memory 121 stores the data division/reconstruction process program P20, the redundant data generation/lost data recovery process program P21, the metadata information distribution management process program P22, and the metadata management table T20. The data stored in the memory 121 is typically the data transferred through the data network 1100 or through the internal network 1102, or the data loaded from the storage device 122. The storage device 122 is, for example, HDD, SSD, or RAID.

The memory 121 stores information read from the storage device 122. In addition, the memory 121 is also used as a cash memory for temporarily storing data received from the host 110. Further, the memory 121 is also used as a work memory of the processor (CPU) 124.

A volatile memory such as DRAM, or a non-volatile memory such as a flash memory is used for the memory 121. The memory 121 can read and write data faster than the storage device 122.

The CPU 124 operates in accordance with programs, calculation parameters, and the like, stored in the memory 121. By operating in accordance with the programs, the CPU 124 operates as a specific functional unit. For example, the CPU 124 performs the analysis process of the object in accordance with the data division/reconstruction program P20 to perform the data division/reconstruction process. Similarly, the CPU 124 perform the metadata information distribution management as well as the redundant data generation/lost data recovery process, respectively, in accordance with the meta data information distribution management process program P22 and the redundant data generation/lost data recovery process program P21. Further, the metadata distribution management process program P22 and the redundant data generation/lost data recovery process program P21 perform the rebalancing process to rearrange data in the storage nodes in response to deletion or addition of storage nodes. Further, the metadata information distribution management program P22 manages which node is the place where the object exists for each object. At this time, the metadata information distribution management process program P22 can obtain all new management information by calculation such as, for example, CRUSH, or can manage the management information by DHT. Further, it is also possible to manage which node comes for each offset of the content.

The storage device 122 provides an area in which the storage 120 temporarily stores an object and control information. It may be possible that the CPU 124 read the object stored in the storage device 122 asynchronously to perform highly reliable data rearrangement process in conjunction with the processes of the data division/reconstruction program P20, the data division/redundant data generation/lost data recovery process program P21, and the metadata information distribution management process program P22. The highly reliable data rearrangement process is a process for keeping the data reliability high by reading, rearranging, and rewriting data. Note that the object may be held in the memory 125 to omit the storage device 122.

Figure 4:
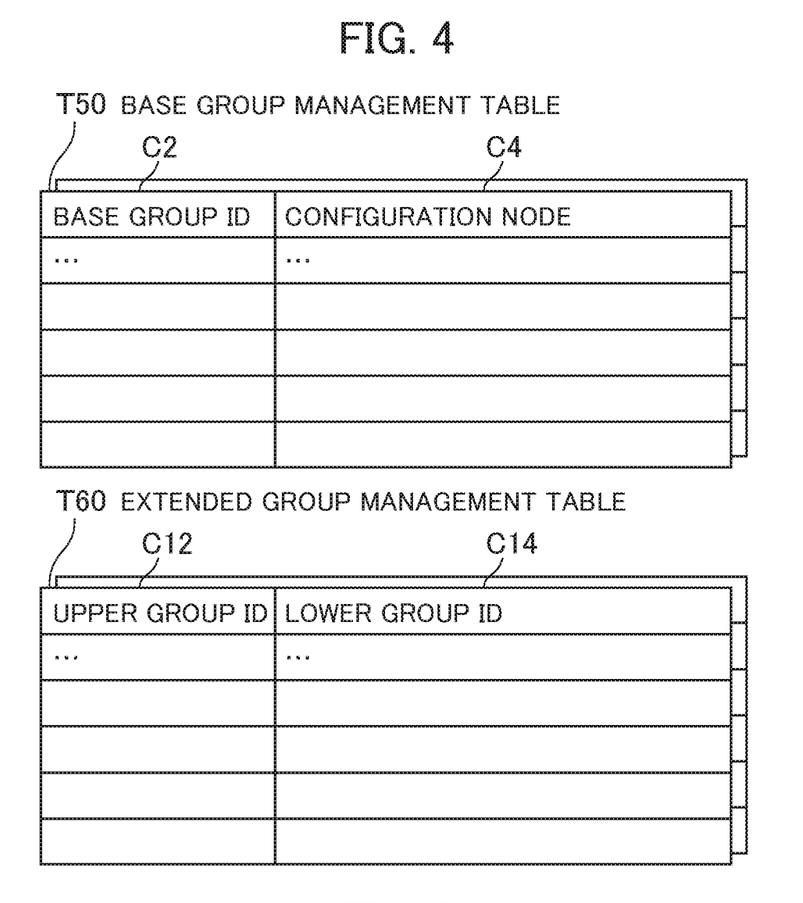
FIG. 4 is a diagram showing a configuration example of a group management table.

FIG. 4 is a diagram showing a configuration example of a group management table. The group management table includes a base group management table T50 and an extended group management table T60. The content of the group management table is determined in advance and is set in a fixed manner. For example, the group management table is recorded in the memory 121.

The base group management table T50 of this example has a table structure. In the base group management table T50, a base group ID C2 and a configuration node C4 are associated with each other and recorded.

The base group ID C2 stores information of a base group which is a group of storage nodes that implement the distributed erasure coding scheme by a relatively small number of nodes. The base group has a plurality of management tables for each of its data security levels. Further, the base group has a plurality of entries for each data security level. The data security level of the base group can be set from the management PC. The configuration node C4 is the information on the storage nodes that configure the base group ID C2.

The extended group management table 60 of this example has a table structure. The extended group management table T60 has an upper group ID C12 and a lower group ID C14.

The upper group ID C12 stores the extended group ID which is identification information of an extended group configured with a plurality of groups. The lower group ID C14 stores the group ID of a group (lower group) that configures the upper group ID. The lower group can be the base group or the extended group.

By configuring groups of different numbers of nodes based on the base group and the extended group, a plurality of data security levels are provided, and at the same time, storage nodes are allocated to each group in a fixed manner.

Figure 5:
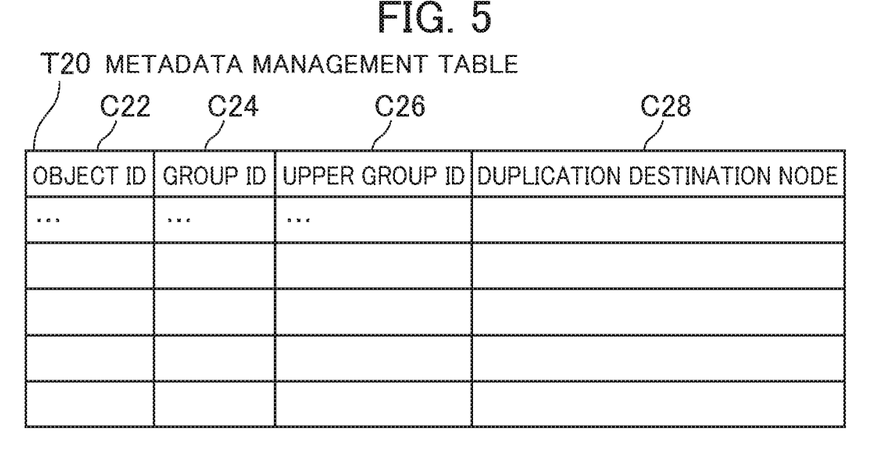
FIG. 5 is a diagram showing a configuration example of a metadata management table T20.

FIG. 5 is a diagram showing a configuration example of the metadata management table T20. The metadata management table T20 of this example has a table structure. The metadata management table T20 stores metadata on the data (objet) stored in the distributed storage system 1. The metadata includes an object ID C22 pertaining to the object, a group ID C24, an upper group ID T26, and a duplication destination node 28. The metadata management table T20 shown in FIG. 5 is recorded, for example, in the memory 121.

The object ID C22 stores the object ID which is the identification information of the object (data).

The group ID C24 indicates the group ID of the group which is the write destination of the data indicated by the object ID C22. The group ID 24 stores the base group ID C2 in the base group management table T50 or the upper group ID C12 in the extended group management table T60.

The upper group ID C26 stores the upper group ID which is the identification information of the next higher level group, including the group which is the write destination of the data that is indicated by the object ID C22. The upper group ID C26 stores the upper group ID C12 of the extended group management table T60. The upper group ID C12 is used in the determination of the duplication destination group which is the group for creating a copy of the data on the memory.

When a copy of the data is created on the memory, the duplication destination node C28 indicates the storage node that creates the copy. For example, it may be possible to calculate the duplication destination node C28 by using the upper group ID C26 and the object ID.

Next, a description is given of various operations of the storage node in the distributed storage system 1 according to the present embodiment.

For example, in the storage node 120, the memory 121 stores the group management information T40, T50 in which a group configured with a plurality of storage nodes and the storage nodes configuring the group are associated with each other and recorded. Then, the CPU 124 converts the data into a plurality of data blocks so that the data is redundant at a predetermined data protection level. Then, the CPU 124 stores the data blocks in each of a plurality of storage nodes belonging to the same group by referring to the group management information T40, T50. In this way, the data blocks pertaining to the same data are arranged in the storage nodes of the same group in order to limit overlapping failure of the data blocks pertaining to the same data to within the group. As a result, it is possible to reduce the probability of occurrence of data loss when the storage nodes fail at the same time.

Figure 6:
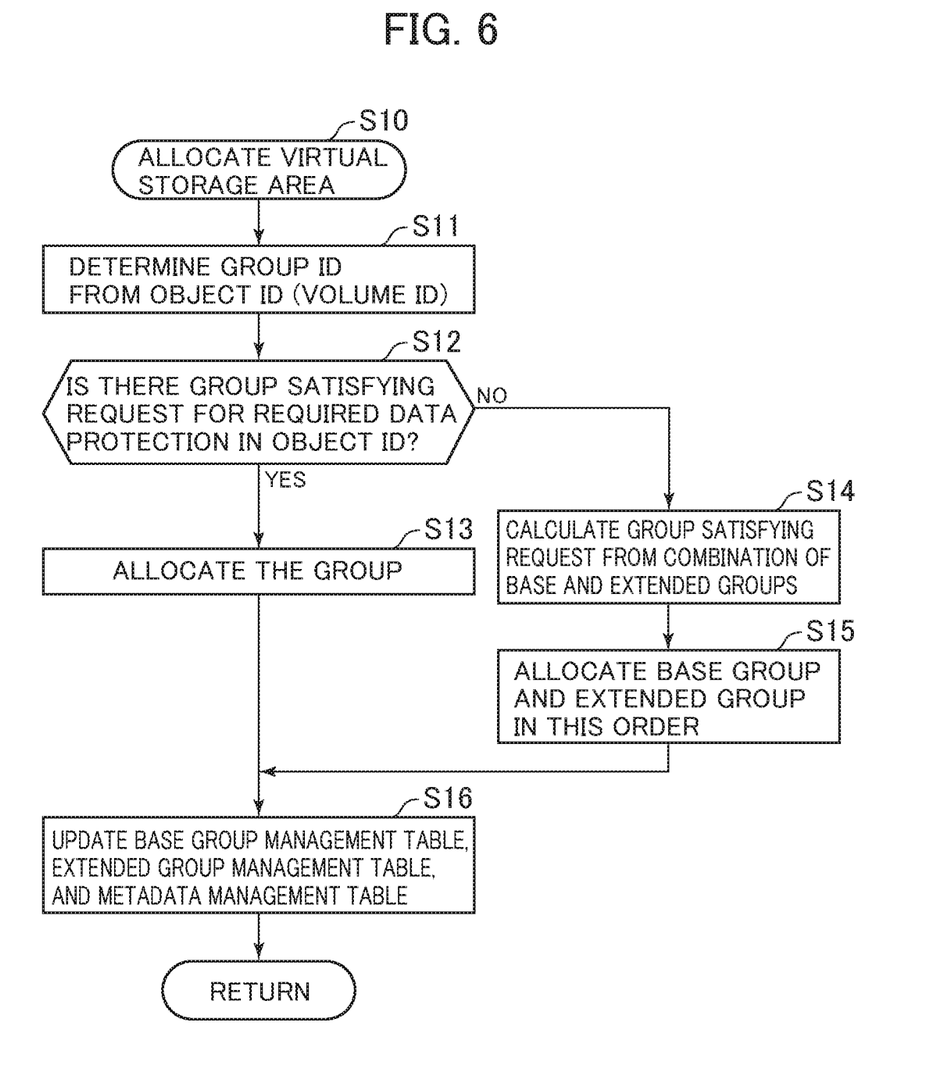
FIG. 6 is a schematic flow chart of the process for allocating virtual storage areas.

FIG. 6 is a schematic flow chart of the process for allocating virtual storage areas. The process for allocating virtual storage areas is performed by the storage nodes 120 and 130 of the distributed storage system 1, more specifically, by the CPUs 124 and 134 of the storage node 120 and 130. Here, it is assumed, as an example, that the storage node 120 performs the process.

The virtual storage area is the area in which the host 110 writes and reads data by the write and read process. The virtual storage area is represented by the base group ID C2 of the base group management table T50, or represented by the upper group ID C12 of the extended group management table T60.

Referring to FIG. 6, when the storage node 120 receives a virtual storage area allocation process request from the management system 150, the metadata information distribution management process of the storage node 120 determines the group ID from the object ID (volume ID) (Step S11). The method of determining the group ID is not particularly limited. However, since the object ID (volume ID) is specified in the virtual storage area allocation process request, the metadata information distribution management process can also determine the group ID by applying a predetermined operation to the value.

Next, the metadata information distribution management process of the storage node 120 checks whether there is a group that satisfies the data protection level required for the data of the object specified in the object ID, by searching the base group management table T50 and the extended group management table T60 (Step S12). When the number of storage nodes 120 belonging to a group is equal to or more than the total number of data blocks, which is the sum of the divided data blocks and the redundant data blocks according to the erasure coding scheme satisfying a required data protection level, the group of the storage nodes 120 can satisfy the data protection level.

When there is a group that satisfies the required data protection level, the metadata information distribution management process allocates the found group and the upper group to the object (Step S13).

On the other hand, when there is no group that satisfies the required data protection level, the storage 120 proceeds to Step S14. In Step S14, the metadata information distribution management process calculates the group that satisfies the required data protection level from the combination of base and extended groups (Step S14), and then allocates new groups, namely, base group and extended group in this order (Step S15).

After Step S13 or after Step S15, the metadata information distribution management process updates the base group management table T50, the extended group management table T60, and the metadata management table T20 (Step S16), and completes the process.

As described above, when the storage nodes are allocated to each of a plurality of data blocks, if there is a group having the number of storage nodes equal to the number of data blocks including redundant data in the group management information T40, T50, the CPU 124 that performs various processes allocates the storage nodes of the group to each of the data blocks. On the other hand, if there is no group having the number of storage nodes equal to the number of data blocks, the CPU generates a group having the number of storage nodes equal to the number of data blocks. Then, the CPU allocates the storage nodes of the group to each of the data blocks.

In this way, when there is a group having the number of storage nodes equal to the number of data blocks pertaining to the same data, the CPU 124 allocates the data to the group. On the other hand, when there is no group having the number of storage nodes equal to the number of data blocks, the CPU 124 generates a group having the number of storage nodes equal to the number of data blocks, and then allocates the data to the generated group. Thus, it is possible to allocate a group having the appropriate number of storage nodes, even if there is data having various numbers of data blocks.

Further, when generating a new group having the number of storage nodes equal to the number of data blocks, the CPU 124 generates an extended group, which is a new group, by combining existing groups (Steps S14 and S15). Because a new group is generated by combining existing groups, the range of distributing and arranging the data blocks pertaining to the same data is unrelated to the existing groups. Thus, it is possible to prevent a significant increase in the probability of occurrence of overlapping failure in a plurality of data blocks pertaining to the same data.

Further, when the CPU 124 generates a new extended group, a new extended group is configured in such a way that, of the existing groups, the base group not containing other groups is given preference over the extended group containing other groups (Step S15). By prioritizing the base group, it is possible to prevent the storage nodes belonging to both base group and extended group from further belonging to the new extended group. As a result, it is possible to prevent the load from concentrating in a specific storage node.

In this way, the process for allocating virtual storage areas is completed.

Figure 7:
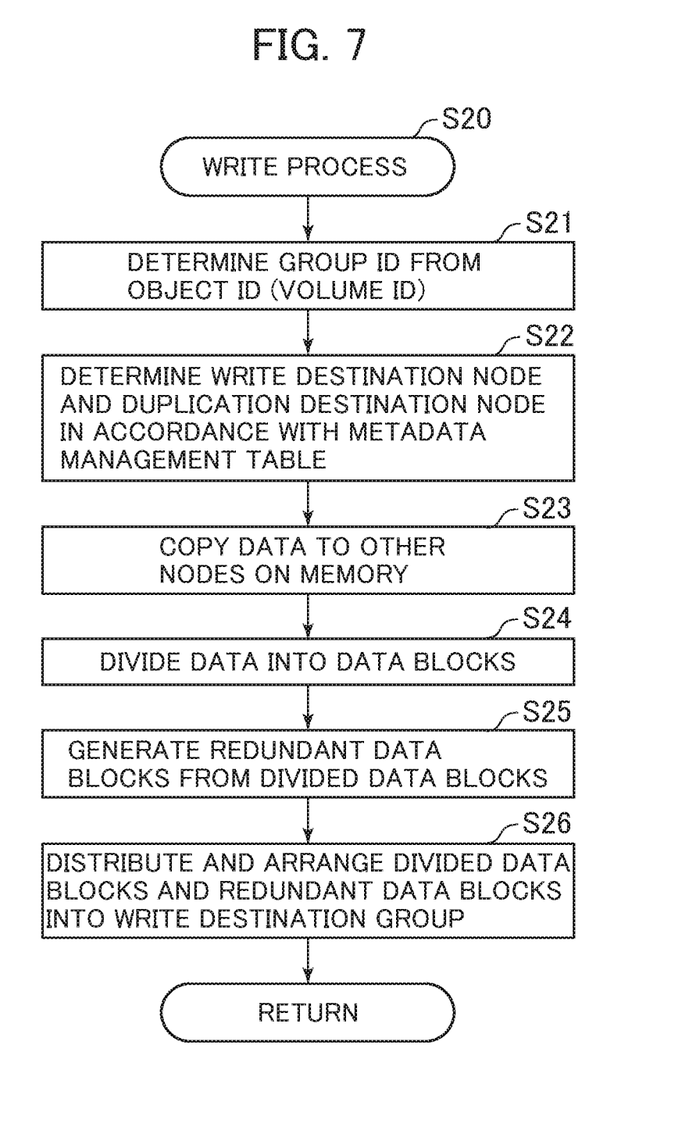
FIG. 7 is a flow chart showing the outline of the data write process.

FIG. 7 is a flow chart showing the outline of the data write process. Here, a description is given of the data write process in which the storage node 120 stores data of the data write process, which is received from the host 110, into the storage device 12.

Since the object ID (volume ID) is given to the data required to be written in the data write process, the storage node 120 determines the group ID of the group for storing the data specified by the object ID, from the object ID (volume ID) (Step S21). At this time, the metadata information distribution management process program P22 further determines the storage node for storing the data, from the object ID of the received data (object) (Step S22).

For example, when the metadata management table T20 is present, it is possible to determine from the object ID the storage node that manages the particular object ID, and inquire the particular storage node about the storage destination node of the object ID. On the other hand, when the metadata management table T20 is not present, the metadata information distribution management process program P22 can determine the storage node, which is the storage destination, by an operation using an algorithm such as CRUSH.

After that, by using the object ID, the duplication process program P23 obtains information of the upper group ID and duplication destination node corresponding to the particular object ID from the metadata management table T20, and creates a copy of the object on the memory 11 (Step S23). Under given conditions on the LRU or elapsed time after reception of the object, the duplication process program P23 repeats processing of a write request of the received object in the copy on the memory, if the LRU or the elapsed time after reception of the object is within the given conditions. Then, when the LRU or the elapsed time after reception of the object exceeds the given conditions, the duplication process program P23 starts the write process for writing to the storage device 12.

In the write process, the data division/reconstruction process program P20 performs the process of dividing the data into a plurality of data blocks (Step S24), and the redundant data generation/lost data recovery process program P21 generates a redundant data block for the divided data block (Step S25). Then, the data division/reconstruction process program P20 distributes and arranges the divided data blocks and the redundant data blocks in a plurality of storage nodes of the group, which is determined as the write destination, through the internal network 1102 (Step S26). The method of determining the write destination group can be, for example, to select a group to which the storage node determined as the data write destination node in Step S22 belongs and set the group as the write destination group.

After the divided data blocks and the redundant data blocks are distributed and arranged in the storage device 12, the duplication process program P23 deletes the copy of the data that remains in the memory 11. Then, the storage node 120 returns a completion response indicating that the write process is completed, to the host 110 through the data network 1100.

In this way, the data write process is completed.

Figure 8:
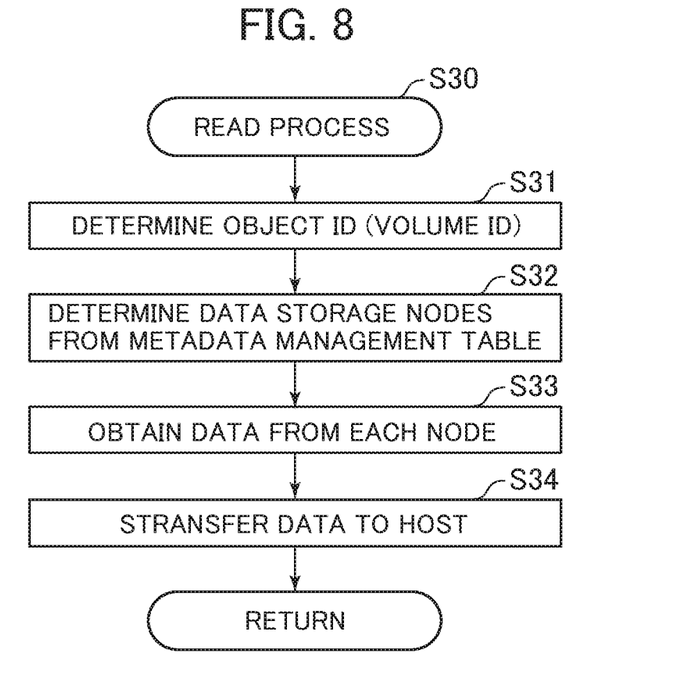
FIG. 8 is a flowchart showing the outline of the data read process.

FIG. 8 is a flow chart showing the outline of the data read process.

In the storage node 120, the metadata information distribution management process program P22 determines the object ID from a read request received by the host 110 (Step S31), and determines the storage node that stores data to be read (Step S32). The method of determining the object ID can be, for example, to calculate the object ID by a predetermined operation from the address of the data that is read by the received read process. With respect to the method of determining the storage node that stores data to be read, the method can calculate the storage node by a predetermined operation from the object ID obtained in Step S32.

Next, the data division/reconstruction process program P20 obtains data to be read in conjunction with the data division/reconstruction process of the respective storage nodes in which the divided data blocks or the redundant data blocks are distributed and arranged (Step S33). At this time, the data division/reconstruction process program P20 obtains divided data blocks from the respective storage nodes, and reconstructs the data blocks. Further, when there is a data loss, the data division/reconstruction process program P20 obtains divided data blocks and redundant data blocks from the respective storage nodes, and performs the rebuild process based on the obtained data blocks to recover the data. Further, the data division/reconstruction process program P20 transmits the obtained data to the host 110 (Step S34), and completes the process.

In this way, the data read process is completed.

Next, a description is given of the failure recovery process when a failure occurs in the storage node in which the divided data blocks are arranged.

First, the metadata information distribution management process program P22 determines the storage node for storing data after the recovery process of the storage node in which a failure occurred. Then, the data division/reconstruction process obtains a plurality of data blocks from the storage node in which divided data blocks or redundant data blocks are arranged, to recover the data by the rebuild process based on the obtained data blocks, in conjunction with the redundant data/lost data recovery process.

Further, the data division/reconstruction process stores the recovered data in the storage node that is determined as the storage node to store the data. Then, the metadata information distribution management process program P22 updates the storage destination node information which is the information of the storage node in which the data is stored, and ends the process.

Second Embodiment

The first embodiment shows an example in which the number of storage nodes that configure the base group and the extended group is equal to the number (the minimum number of configuration nodes) which is the sum of the divided data blocks obtained by dividing the data to be stored and the redundant data blocks calculated based on the divided data blocks.

On the other hand, in the second embodiment, the number of storage nodes that configure the base group and the extended group is set to N times the minimum number of configuration nodes described in the first embodiment. Then, the storage node 120 distributes and arranges the divided data blocks and the redundant data blocks into storage nodes within the group. At this time, the divided data blocks and the redundant data blocks are randomly arranged into the storage nodes within the group to avoid a concentration of the data read process and the rebuild process, thus enabling higher performance of the process.

Note that, for example, N is no larger than 2. Further, although the number of storage nodes that configure each group increases due to being multiplied by N times, the storage nodes are allocated to each group in a fixed manner that is not different from the first embodiment.

With respect to a distributed storage system of the second embodiment as well as storage nodes that configures the distributed storage system, the software process is basically the same as the process of the first embodiment shown in FIG. 2, and the hardware configuration is the same as that of the first embodiment shown in FIG. 3. Hereinafter, the point where the second embodiment differs from the first embodiment will be described.

Figure 9:
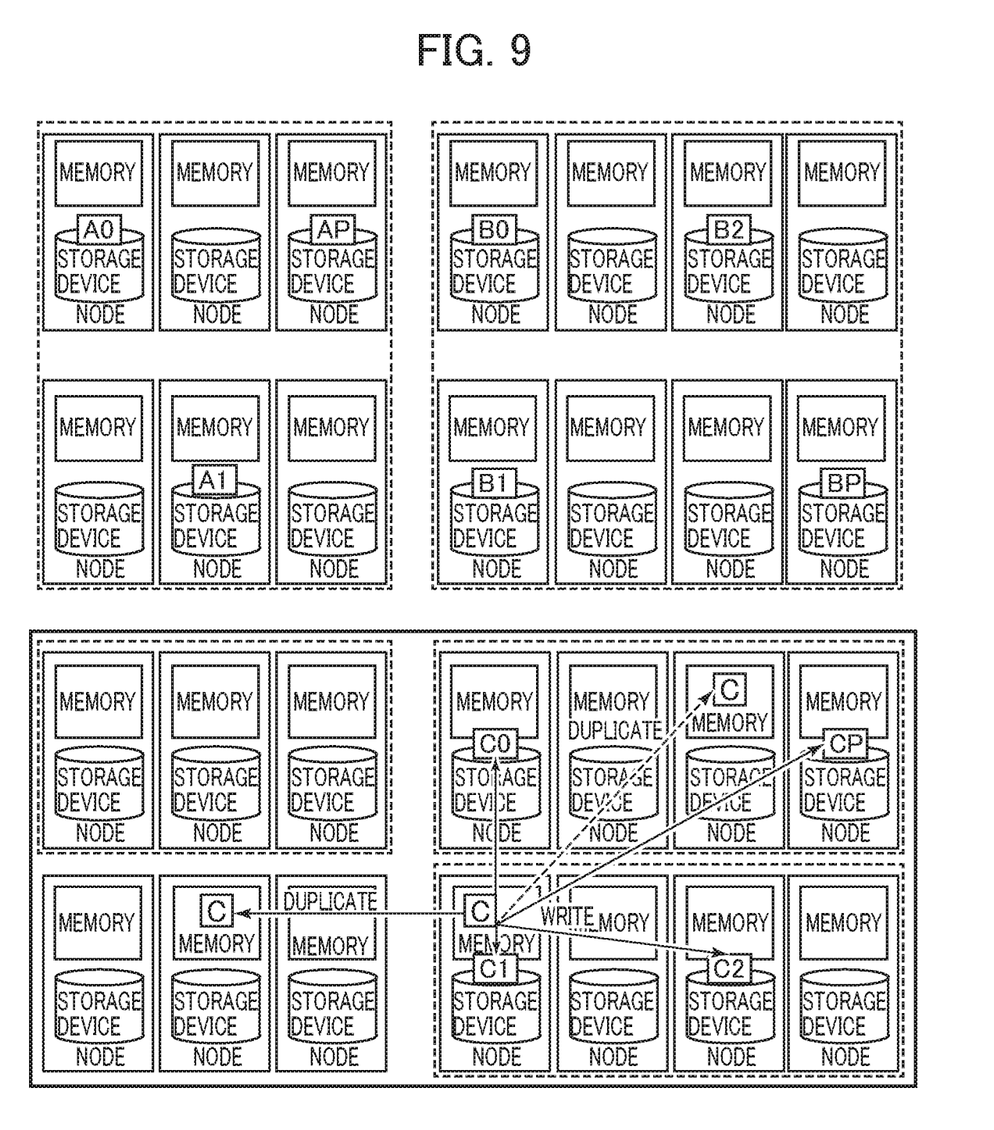
FIG. 9 is a block diagram showing a schematic configuration of a distributed storage system according to a second embodiment.

FIG. 9 is a block diagram showing a schematic configuration of a distributed storage system according to the second embodiment. FIG. 9 shows the grouping of storage nodes in the second embodiment, and showing that write data is divided, distributed, and arranged in a plurality of storage nodes.

FIG. 9 differs from FIG. 1 in that the number of storage nodes that configure each group increases, and that divided data blocks and redundant data blocks are distributed and arranged into the storage nodes that are randomly selected within the group. The specific process is as follows: In Step S26 of FIG. 7, the data division/reconstruction process program P20 distributes and arranges the divided data blocks and the redundant data blocks into the storage nodes that are randomly selected within the write destination group.

Further, in FIG. 9, the data storage destination of the object ObC is a base group 1 surrounded by the dashed line, and the upper group of the base group 1 is an extended group 1 surrounded by the thick line. For example, after receiving the data, the duplication process program P23 performs the duplication process within the upper group. After that, the data division/reconstruction process program P20 distributes and arranges divided data blocks and redundant data blocks into the storage nodes that are randomly determined within the base group 1. Further, the recovered data after application of the rebuild process is distributed and arranged in other storage nodes within the same group (base group 1).

As described above, in the present embodiment, when a plurality of data blocks are stored in each of a plurality of storage nodes belonging to the same group, the CPU 124 allocates the data blocks to the storage nodes selected from the storage nodes belonging to a group having the number of storage nodes equal to an integer N times the number of data blocks. In this way, the storage nodes in which a plurality of data blocks pertaining to the same data are distributed and arranged is limited to within one group, enabling a reduction in the probability of occurrence of overlapping failure in a plurality of data blocks pertaining to the same data. In addition, the number of storage nodes of the base group and extended group for allocation of storage nodes of a group in a fixed manner is increased to an integer times. In this way, it is possible to reduce process load by avoiding the need to simultaneously perform the rebuild process, and the like, on all data distributed and arranged in the particular group. More specifically, the CPU 124 is designed to avoid concentration of data accesses to a specific storage node during the data read process and the rebuild process to improve process performance as a whole.

Further, the CPU allocates a plurality of data blocks to the storage nodes that are randomly selected from the storage nodes belonging to a group having the number of storage nodes equal to an integer times the number of data blocks. By randomly selecting storage nodes to arrange data blocks, it is possible to arrange the data blocks equally in the storage nodes within the group. Thus, it is possible to reduce the number of data requiring the rebuild process at the same time due to overlapping failure and thus to reduce process load.

Third Embodiment

In the distributed storage system, data may be copied on the memory between storage nodes. However, the memory is finite and so the distributed storage system may run out of memory in the storage nodes of the group in which the copy should be created. In this case, the destination for creating a copy should be changed to a storage node of another group. The storage node of the third embodiment is configured such that, when a copy of data is created, the data is copied to a storage node belonging to a given group set in a fixed manner. As a result, it is possible to define which data is copied to which group. Further, in the case of creating a plurality of copies of certain data, these copies can be created in storage nodes belonging to the same group. Thus, it is possible to limit the range of data having an effect on the copies when a failure occurs in the storage nodes.

In the distributed storage system using the erasure coding scheme, a plurality of divided data blocks and redundant data blocks are generated from data as described in the first embodiment. Thus, when the data is updated, the process of parity recalculation typically occurs at high frequency in response to the data update. On the other hand, the third embodiment uses a copy of data to reduce the frequency of parity operation for generating a redundant data block. Further, by limiting the destination of copies of the same data to storage nodes within the same group, it is possible to reduce the probability of occurrence of data loss due to a failure of storage nodes.

In a distributed storage system of the third embodiment as well as storage nodes that configure the distributed storage system, the software process is basically the same as the process of the first embodiment shown in FIG. 2, and the hardware configuration is the same as that of the first embodiment shown in FIG. 3. Hereinafter, the point where the third embodiment differs from the first embodiment will be described.

Figure 10:
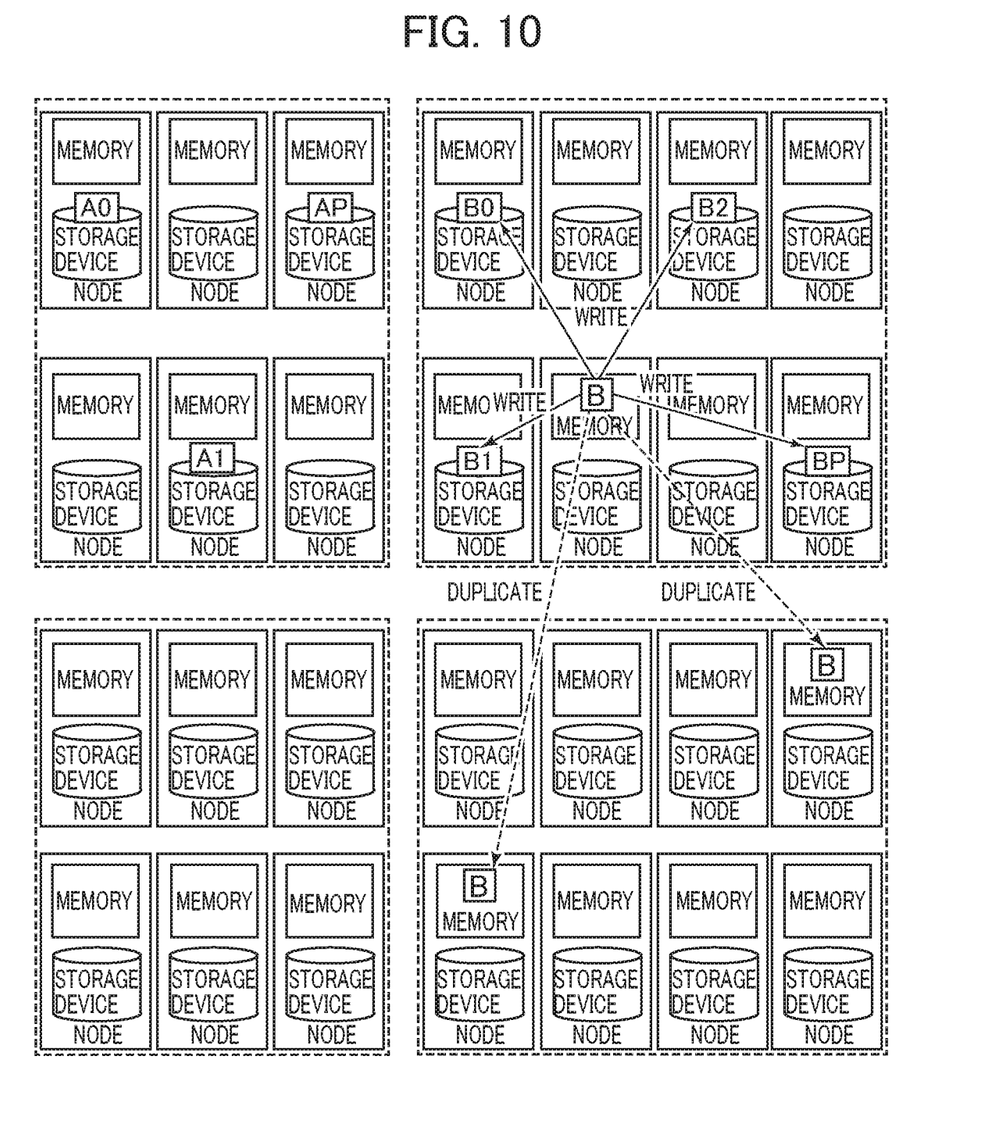
FIG. 10 is a block diagram showing a schematic configuration of a distributed storage system according to a third embodiment.

FIG. 10 is a block diagram showing a schematic configuration of a distributed storage system according to the third embodiment. FIG. 10 shows the grouping of storage nodes in the third embodiment, and showing that write data is divided, distributed, and arranged in a plurality of storage nodes. In the third embodiment, when the destination for creating a copy of the data on the memory is changed to another group, all copies of the same data are created in the storage nodes of the same group. In, FIG. 10, a copy of the object ObB is created on the memory of a storage node of another given group.

While embodiments and examples of the present invention have been described, the present invention is not limited to the exemplary embodiments. Other various modifications can be made in the present invention. For example, the exemplary embodiments have been described in detail to better illustrate the present invention and are not necessarily limited to those having all the configurations described in the exemplary embodiments. Further, part of the configuration of an embodiment can be replaced by the configuration of any other embodiment, and the configuration of an embodiment can be added to the configuration of any other embodiment. Further, with respect to part of configurations of the respective embodiments described above, it is possible to make addition, deletion, and replacement of other configurations.

Further, some or all of the configurations, functions, process units and the like may be implemented in hardware, for example, by a design with an integrated circuit. Further, each of the configurations, functions, and the like described above may be implemented in software in such a way that the processor interprets and executes the program to implement each function. The information of programs, tables, and files that implement the respective functions can be placed in a memory, a hard disk, a storage device such as SSD (Solid State Drive), or recording media such as IC card and SD card. Further, control lines or information lines that are considered as being required for the description are only illustrated, and it may not be necessarily limited that all of the control lines and information lines are illustrated on the product. It may be considered that almost all of the configurations are actually connected each other.

LIST OF REFERENCE SIGNS

1 . . . distributed storage system, 10 . . . storage node, 11 . . . memory, 110 . . . host, 1100 . . . data network, 1102 . . . internal network, 12 . . . storage device, 120 . . . storage node, 121 . . . memory, 122 . . . storage device, 124 . . . CPU, 125 . . . memory, 130 . . . storage node, 150 . . . management system, P20 . . . data distribution/reconstruction process program, P21 . . . redundant data generation/lost data recovery process program, P22 . . . metadata information distribution management process program, P23 . . . duplication process program, T20, T30 . . . metadata management table, T40 . . . group management information, T50 . . . base group management table, T60 . . . extended group management table

The invention claimed is:

1. A distributed storage system comprising a plurality of storage nodes,
   wherein each of the storage nodes includes:
   a storage device for storing data in such a way that the data is capable of being written thereto and read therefrom;
   a memory in which a software program is recorded; and
   a central processing unit (CPU) for executing the software program,
   wherein the memory stores group management information in which each group of a plurality of groups is configured with a plurality of storage nodes and the storage nodes that configure the group are associated with each other and recorded,
   wherein the CPU converts the data into a plurality of data blocks so that the data is redundant at a predetermined data protection level, and stores the data blocks into a plurality of storage nodes belonging to a same group based on the group management information,
   wherein a plurality of data are stored in the plurality of groups, and the plurality of data are stored in the plurality of storage nodes dispersedly such that each of the plurality of data is stored in storage nodes belong to the same group, and
   wherein when allocating storage nodes to each of the plurality of data blocks, if there is a group of the plurality of groups having the number of storage nodes equal to the number of the data blocks in the group management information, the CPU allocates the storages nodes of the group to each of the data blocks, and if there is no group of the plurality of groups having the number of storage nodes equal to the number of the data blocks, the CPU generates a group having the number of storage nodes equal to the number of the data blocks, and allocates the storage nodes of the group to each of the data blocks.

2. The distributed storage system according to claim 1, wherein when generating a new group of the plurality of groups having the number of storage nodes equal to the number of the data blocks, the CPU generates an extended group, which is the new group, by combining existing groups.

3. The distributed storage system according to claim 2, wherein when generating a new extended group, of the existing groups, the CPU configures the new extended group by prioritizing the base group not containing other groups over the extended group containing other groups.

4. The distributed storage system according to claim 1, wherein when storing the plurality of data blocks in each of a plurality of storage nodes belonging to the same group, the CPU allocates the plurality of data blocks to storage nodes selected from the storage nodes belonging to a group having the number of storage nodes equal to an integer times the number of the data blocks.

5. The distributed storage system according to claim 4, wherein the CPU allocates the plurality of data blocks to storage nodes randomly selected from the storage nodes of a group having the number of storage nodes equal to an integer times the number of the data blocks.

6. The distributed storage system according to claim 1, wherein when creating a copy of the data, the CPU copies the data to a storage node belonging to a given group set in a fixed manner.

7. A distributed storage system comprising a plurality of storage nodes,
wherein each of the storage nodes includes:
a storage device for storing data in such a way that the data is capable of being written thereto and read therefrom;
a memory in which a software program is recorded; and
a central processing unit (CPU) for executing the software program,
wherein the memory stores group management information including: base group management information in which base group identification information which is identification information of a base group obtained by grouping a plurality of storage nodes, and node identification information which is identification information of the storage nodes belonging to the base group are associated with each other; and extended group management information in which upper group identification information which is identification information of an extended group obtained by grouping storage nodes of a plurality of groups, and lower group identification information which is identification information of the groups belonging to the extended group are associated with each other,
wherein when storing data, the CPU converts the data into a plurality of data blocks so that the data is redundant at a predetermined data protection level, arranges the data blocks in each of a plurality of storage nodes, refers to the group management information to determine whether or not there is a group having the number of storage nodes equal to the number of the data blocks that are converted from the data, if there is a group having the number of storage nodes equal to the number of the data blocks, allocates the group to the data, if there is no group having the number of storage nodes equal to the number of the data blocks, selects a base group and an extended group in this order from the existing groups to combine the selected groups, generates an extended group having the number of storage nodes equal to the number of the data blocks, allocates the extended group to the data, updates the group management information according to a result of the allocation, and stores the plurality of data blocks pertaining to the data into a plurality of storage nodes belong to the group that is allocated to the data by referring to the updated group management information, and
wherein a plurality of data are stored in the plurality of groups dispersedly such that each of the plurality of data is stored in storage nodes belonging to a same group.

8. A data storage method in a storage system comprising a plurality of storage nodes, each of the storage nodes including: a storage device for storing data in such a way that the data is capable of being written thereto and read therefrom; a memory in which a software program is recorded; and a central processing unit (CPU) for executing the software program,
wherein the CPU of the storage node performs the data storage method, comprising:
converting the data into a plurality of data blocks so that the data is redundant at a predetermined data protection level;
referring to group management information stored in the memory, in which each group of a plurality of groups to which a plurality of storage nodes belong and the storage nodes that configure the group are associated with each other and recorded;
storing the data blocks into a plurality of storage nodes belonging to a same group based on the group management information,
wherein a plurality of data are stored in the plurality of groups, and the plurality of data are stored in the plurality of storage nodes dispersedly such that each of the plurality of data is stored in storage nodes belong to the same group, and
wherein when allocating storage nodes to each of a plurality of data blocks pertaining to the same data, if there is a group having the number of storage nodes equal to the number of the data blocks in the group management information, the CPU allocates the storage nodes of the group to each of the data blocks, and if there is no group having the number of storage nodes equal to the number of the data blocks, the CPU generates a group having the number of storage nodes equal to the number of the data blocks, and allocates the storage nodes of the group respectively to the divided data blocks and the redundant data blocks.

9. The data storage method according to claim 8, wherein when generating a new group having the number of storage nodes equal to the number of the data blocks, the CPU generates an extended group, which is the new group, by combining existing groups.

10. A software program for performing the steps of:
converting, via a central processing unit (CPU), data into a plurality of data blocks so that the data is redundant at a predetermined data protection level;
referring to group management information stored, via a memory, in which each group of a plurality of groups configured with a plurality of storage nodes, each storage node in the plurality of storage nodes incudes a storage device for storing data in such a way that the data is capable of being written thereto and read therefrom and the storage nodes that configure the group are associated with each other and recorded;

storing the data blocks into a plurality of storage nodes belonging to a same group based on the group management information, wherein a plurality of data are stored in the plurality of groups, and the plurality of data are stored in the plurality of storage nodes dispersedly such that each of the plurality of data is stored in storage nodes belong to the same group, and wherein the software program allows the CPU to perform the steps of:

when allocating storage nodes to each of a plurality of data blocks pertaining to the same data, if there is a group having the number of storage nodes equal to the number of the data blocks in the group management information, allocating the storage nodes of the group to each of the data blocks; and if there is no group having the number of storage nodes equal to the number of the data blocks, generating a group having the number of storage nodes equal to the number of the data blocks, and allocating the storage nodes of the group to each of the data blocks.

11. The software program according to claim 10, wherein when generating a new group having the number of storage nodes equal to the number of the data blocks, the software program allows the CPU to perform a step of generating an extended group, which is the new group, by combining existing groups.

* * * * *